United States Patent
Zhang et al.

(10) Patent No.: US 11,249,854 B2
(45) Date of Patent: Feb. 15, 2022

(54) METHOD AND DEVICE FOR FAILOVER IN HBASE SYSTEM, AND NON-TRANSITORY COMPUTER-READABLE STORAGE MEDIUM

(71) Applicant: BEIJING XIAOMI MOBILE SOFTWARE CO., LTD., Beijing (CN)

(72) Inventors: Guanghao Zhang, Beijing (CN); Duo Zhang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 163 days.

(21) Appl. No.: 16/694,698

(22) Filed: Nov. 25, 2019

(65) Prior Publication Data

US 2021/0064473 A1   Mar. 4, 2021

(30) Foreign Application Priority Data

Aug. 30, 2019 (CN) .......................... 201910817715.9

(51) Int. Cl.
   *G06F 7/00*    (2006.01)
   *G06F 11/14*   (2006.01)
   *G06F 16/25*   (2019.01)
   *G06F 16/23*   (2019.01)

(52) U.S. Cl.
   CPC ...... *G06F 11/1451* (2013.01); *G06F 16/2365* (2019.01); *G06F 16/258* (2019.01); *G06F 2201/80* (2013.01)

(58) Field of Classification Search
   CPC .............. G06F 11/1451; G06F 16/258; G06F 16/2365; H04F 2201/80
   USPC ................................................. 707/600–899
   See application file for complete search history.

(56) References Cited

U.S. PATENT DOCUMENTS

| 2010/0161565 | A1  | 6/2010 | Lee |
| 2014/0279855 | A1* | 9/2014 | Tan ........................ G06F 16/273 |
|              |     |        | 707/609 |
| 2014/0279881 | A1  | 9/2014 | Tan et al. |

(Continued)

OTHER PUBLICATIONS

Diego Ongaro et al: "Fast crash recovery in RAMCloud", Operating Systems Principles, ACM, 2 Penn Plaza, Suite 701 New York NY 10121-0701 USA, Oct. 23, 2011 (2011-19-23), pp. 29-41, XP058005743, DOI: 10.1145/2043556.2043560 ISBN: 978-1-4503-0977-6 * abstract ** figure 1 * * Sections 3.4-3.6 *.

(Continued)

*Primary Examiner* — Isaac M Woo
(74) *Attorney, Agent, or Firm* — Syncoda LLC; Feng Ma

(57) ABSTRACT

A method for failover in an HBase system, applied to a first worker node in the HBase system, includes: a write-ahead logging (WAL) file sent by a management node in the HBase system is acquired, the WAL file including WAL files of multiple table fragments in a second worker node in the HBase system when the second worker node fails; the WAL file is split in the memory of the present node to obtain the WAL files of the multiple table fragments; updated data of the multiple table fragments in a memory of the second worker node when the second worker node fails is determined according to the WAL files of the multiple table fragments in the memory of the first worker node; and the updated data of the multiple table fragments is written into a hard disk of the first worker node.

20 Claims, 9 Drawing Sheets

(56) References Cited

U.S. PATENT DOCUMENTS

2016/0188649 A1    6/2016   Tan et al.
2016/0188690 A1    6/2016   Tan et al.

OTHER PUBLICATIONS

Edward Bortnikov et al: "Accordion", Proceedings of the VLDB Endoument; [ACM Digital Library], Assoc. of Computing Machinery, New York, NY, vol. 11, No. 12, Aug. 1, 2018 (Aug. 1, 2018), pp. 1863-1875, XP058416382, ISSN: 2150-8097, DO1: 10.14778/3229863.3229873 * abstract ** figure 1 *.
Supplementary European Search Report in the European application No. 19212579.7, dated Jul. 8, 2020.

* cited by examiner

METHOD AND DEVICE FOR FAILOVER IN HBASE SYSTEM, AND NON-TRANSITORY COMPUTER-READABLE STORAGE MEDIUM

CROSS-REFERENCE TO RELATED APPLICATION

This application claims priority to Chinese patent application No. 201910817715.9 filed on Aug. 30, 2019, the disclosure of which is hereby incorporated by reference in its entirety.

BACKGROUND

HBase is an open-source distributed database. The services provided are deployed on multiple nodes, the multiple nodes form a distributed cluster, and the distributed cluster is also called an HBase system. Based on different types of services that are provided, the HBase system includes a management node and a worker node. The management node is configured to manage table fragment information of the worker node. The worker node is configured to receive a read/write request from a requester and modify table data of a table fragment according to the read/write request.

SUMMARY

The disclosure relates to the technical field of computer communications, and more particularly, to a method and device for failover in an HBase system, and a non-transitory computer-readable storage medium.

According to a first aspect of embodiments of the present disclosure, a method for failover in an HBase system is provided, which may be applied to a first worker node in the HBase system and include that:

a WAL file sent by a management node in the HBase system is acquired, where the WAL file includes WAL files of multiple table fragments in a second worker node in the HBase system when the second worker node fails;

the WAL file is split in a memory of the first worker node to obtain the WAL files of the multiple table fragments;

updated data of the multiple table fragments in a memory of the second worker node when the second worker node fails is determined according to the WAL files of the multiple table fragments in the memory of the first worker node; and the updated data of the multiple table fragments is written into a hard disk of the first worker node.

According to a second aspect of the embodiments of the present disclosure, a device for failover in an HBase system is provided, which may be applied to a first worker node in the HBase system and include:

a processor; and a memory configured to store instructions executable for the processor, the processor is configured to:

acquire a write-ahead logging (WAL) file from a management node in the HBase system, where the WAL file includes WAL files of a plurality of table fragments in a second worker node in the HBase system when the second worker node fails;

split the WAL file in a memory of a first worker node to obtain the WAL files of the plurality of table fragments;

determine, based on the WAL files of the plurality of table fragments in the memory of the first worker node, updated data of the plurality of table fragments in a memory of the second worker node when the second worker node fails; and write the updated data of the plurality of table fragments into a hard disk of the first worker node.

According to a third aspect of the embodiments of the present disclosure, a non-transitory computer-readable storage medium is provided, in which a computer program may be stored, the program being executed by a processor to implement a method for failover in an HBase system, the method being executed by a first worker node in the HBase system, and the method including:

acquiring a write-ahead logging (WAL) file from a management node in the HBase system, the WAL file includes WAL files of a plurality of table fragments in a second worker node in the HBase system when the second worker node fails;

splitting the WAL file in a memory of the first worker node to obtain the WAL files of the plurality of table fragments;

determining, based on the WAL files of the plurality of table fragments in the memory of the first worker node, updated data of the plurality of table fragments in a memory of the second worker node when the second worker node fails; and writing the updated data of the plurality of table fragments into a hard disk of the first worker node.

It is to be understood that the above general descriptions and the following detailed descriptions are only exemplary and explanatory and not intended to limit the present disclosure.

BRIEF DESCRIPTION OF THE DRAWINGS

The accompanying drawings referred to in the specification are a part of this disclosure, and provide illustrative embodiments consistent with the disclosure and, together with the detailed description, serve to illustrate some embodiments of the disclosure.

DETAILED DESCRIPTION

Reference will now be made in detail to some embodiments, examples of which are illustrated in the accompanying drawings. The following description refers to the accompanying drawings in which the same numbers in different drawings represent the same or similar elements unless otherwise represented. The implementations set forth in the following description of some embodiments do not represent all implementations consistent with the present disclosure. Instead, they are merely examples of apparatuses and methods consistent with aspects related to the present disclosure as recited in the appended claims.

Terms used in the present disclosure are only adopted for the purpose of describing specific embodiments and not intended to limit the present disclosure. "A/an," "said" and "the" in a singular form in the present disclosure and the appended claims are also intended to include a plural form, unless other meanings are clearly denoted throughout the present disclosure. It is also to be understood that term "and/or" used in the present disclosure refers to and includes one or any or all possible combinations of multiple associated items that are listed.

The worker node, after receiving the read/write request from the requester, modifies the table data of the table fragment in a memory according to the read/write request to obtain updated data and, when an amount of data in the memory reaches a preset value, writes the updated data in the memory into its own hard disk.

Typically, when the worker node fails, under the circumstance that the amount of the data in the memory of the worker node does not reach the preset value, the updated data in the memory is not written into the hard disk of the worker node and the updated data in the memory is lost.

The present disclosure provides a message sending method, which may be applied to a terminal. The terminal has an information sending function. The terminal may be a mobile phone, a tablet computer, a personal digital assistant and the like.

Figure 1:
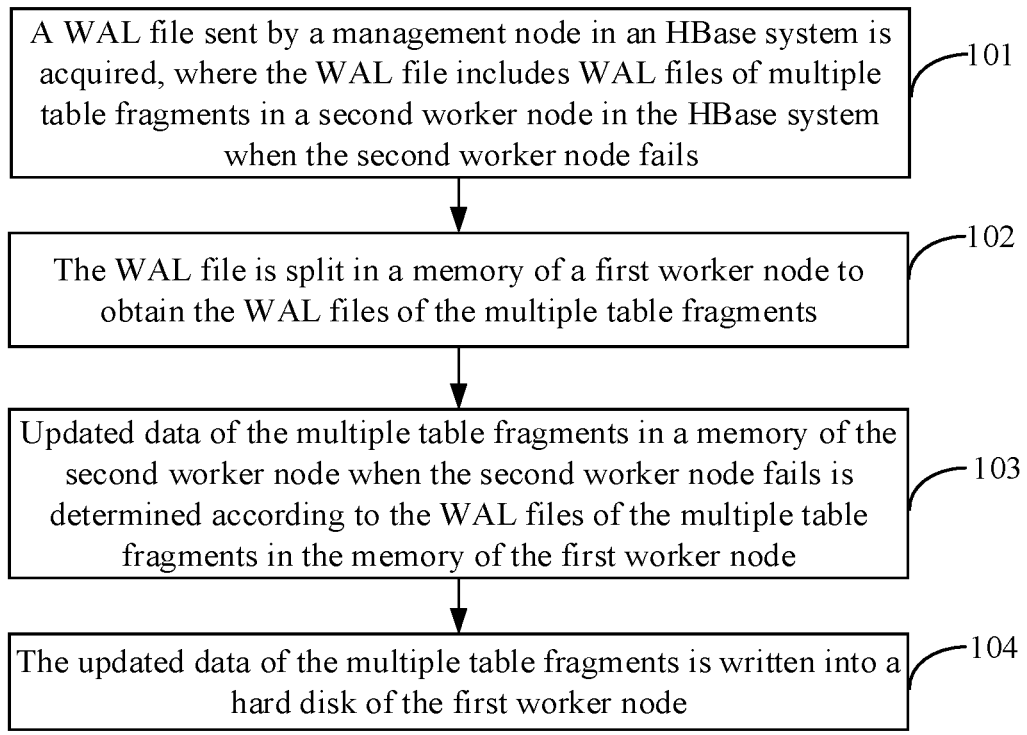
FIG. 1 illustrates a flowchart of a method for failover in an HBase system according to some embodiments of the present disclosure.

FIG. 1 illustrates a flowchart of a method for failover in an HBase system according to some embodiments of the present disclosure. The method illustrated in FIG. 1 is applied to a first worker node in the HBase system. As illustrated in FIG. 1, the failover method for the HBase system includes the following operations.

At block 101, a WAL file from a management node in the HBase system is acquired. The WAL file includes WAL files of multiple table fragments in a second worker node in the HBase system when the second worker node fails.

The HBase system includes the management node (also called a Master) and worker nodes (also called Region Servers). The number of management nodes is one or more. Under a normal circumstance, one management node may manage table fragment information of multiple worker nodes.

The table fragments are obtained by dividing a table. A table may be divided into multiple table fragments. In the HBase system, multiple table fragments of a table are stored in different worker nodes, and a worker node may store multiple table fragments of multiple tables. There are various types of table fragment information, such as, a storage address of the table fragment, a name of the table fragment and a name of a table to which the table fragment belongs.

A worker node is provided with a WAL file, which is used for recording modification logs of data in all table fragments in the worker node. The worker node, after receiving a read/write request from a requester, generates the modification log in the WAL file of the worker node itself according to the read/write request, modifies table data of the table fragment in a memory based on the read/write request to obtain updated data of the table fragment and writes the updated data into its own hard disk. The WAL file of the worker node may be wholly backed up in another device. Here, the other device may include another worker node in the HBase system.

In the embodiment of the present application, the worker nodes at least include the first worker node and the second worker node, and the management node manages table fragment information of the first worker node and the second worker node. The second worker node is a worker node that fails, and the first worker node is a node configured to transfer and persistently store the table data in the second worker node. The management node, after determining that the second worker node fails, may acquire a WAL file backup of the second worker node from another device and send the WAL file backup to the first worker node.

The first worker node may be a node temporarily allocated by a management server when the second worker node fails. Or, a cooperative relationship between the first worker node and the second worker node may be established in advance, and when the second worker node fails, the cooperative relationship is searched to determine the first worker node corresponding to the second worker node.

At block 102, the WAL file is split in a memory of the first worker node to obtain the WAL files of the multiple table fragments.

Under a normal circumstance, the second worker node stores the multiple table fragments. The WAL file of the second worker node includes WAL files of the multiple table fragments. The first worker node, after acquiring the WAL file of the second worker node, may split the WAL file of the second worker node to obtain the WAL files of the multiple table fragments.

The WAL file may be split in many manners. For example, different identifiers are configured for the WAL files of different table fragments, and the identifiers configured for the WAL files may be recognized to split the WAL file of the second worker node to obtain the WAL files of different table fragments. Various identifiers are used, for example, a WAL file name, a WAL file number and a name of a table to which the table fragment belongs.

At block 103, updated data of the multiple table fragments in a memory of the second worker node when the second worker node fails is determined according to the WAL files of the multiple table fragments in the memory of the first worker node.

The first worker node, after splitting the WAL file in the memory to obtain the WAL files of the multiple table fragments, determines the updated data of the multiple table fragments in the memory of the second worker node when the second worker node fails according to the WAL files of the multiple table fragments in the memory of the first worker node. The WAL files, obtained in the memory of the first worker node, of the multiple table fragments are not written into the hard disk of the first worker node but directly read from the memory of the first worker node for use.

During implementation, for each table fragment, a modification process for the table fragment may be re-executed once in the memory according to a modification log in the WAL file of the table fragment, and after execution, the updated data of the table fragment in the memory of the second worker node when the failure occurs is obtained.

At block 104, the updated data of the multiple table fragments is written into a hard disk of the first worker node.

The first worker node, after determining the updated data of the multiple table fragments in the memory of the second worker node when the second worker node fails, writes the updated data of the multiple table fragments into the hard disk of the first worker node, so that the updated data of the table fragments in the memory of the second worker node is transferred and persistently stored, thereby avoiding loss of the data in the memory of the second worker node when the second worker node fails.

The solution provided in the embodiment includes only one disk write operation of writing the updated data of all table fragments into the hard disk of the first worker node, the total number of disk read/write operations is small, and total time consumption in the disk read/write operation is low, so that the solution has the advantages of high failover speed, short failback time, high service availability and the like.

Figure 2:
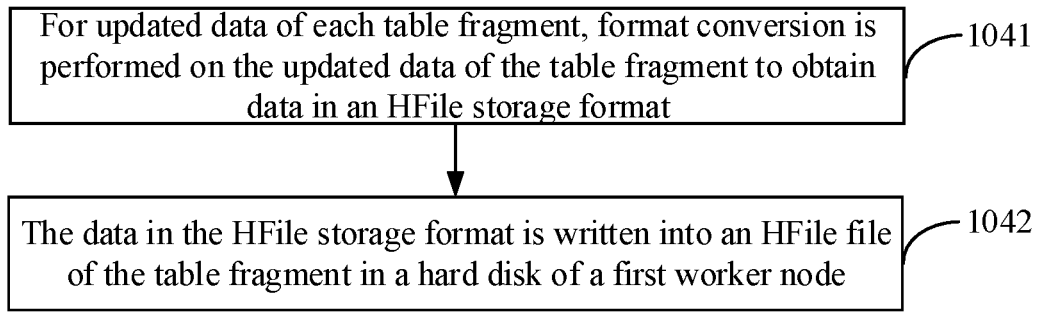
FIG. 2 illustrates a flowchart of another method for failover in an HBase system according to some embodiments of the present disclosure.

In some embodiments, referring to FIG. 2, which illustrates a flowchart of another method for failover in an HBase system according to some embodiments of the present disclosure, the operation illustrated in block 104 may be implemented in the following manner. At block 1041, for the updated data of each table fragment, format conversion is performed on the updated data of the table fragment to obtain data in an HFile storage format. At block 1042, the data in the HFile storage format is written into an HFile file of the table fragment in the hard disk of the first worker node.

For operation illustrated in block 1041, data in the hard disk is stored in an HFile file, and a data format of the HFile file is the HFile storage format. Before the data is written into the hard disk, it is necessary to perform format conversion on the data to obtain the data in the HFile storage format.

For operation illustrated in block 1042, HFile is a data file in HBase and has its own data storage format.

The HFile file of the table fragment in the hard disk may be an original file in the hard disk or a new file generated based on the data in the HFile storage format.

When the HFile file is an original file in the hard disk, the operation illustrated in block 1042 may be implemented in many manners. For example, a first manner: the data, obtained based on the updated data of the table fragment, in the HFile format may contain the identifier of the table fragment, the HFile file of the table fragment in the hard disk may also contain the identifier of the table fragment, the identifier contained in the data in the HFile format may be matched with the identifier contained in the HFile file in the hard disk to search the HFile file containing the same identifier, and the data in the HFile format is written into the HFile file containing the same identifier.

For another example, a second manner: the first worker node acquires a storage address of the HFile file of the table fragment in the second worker node through the management node and then stores the data, in the HFile format, of the table fragment into the HFile file of the table fragment in the hard disk according to the storage address.

Based on the operations illustrated in block 1041 and block 1042, the worker node is endowed with a function of performing format conversion on the updated data of the table fragment to obtain the data in the HFile storage format and writing the data in the HFile storage format into the HFile file of the table fragment in the hard disk of its own node, and performance of the worker node is improved.

In some embodiments, the first worker node may send the updated data, determined in block 103, of the multiple table fragments to another worker node in the HBase system for backup.

Figure 3:
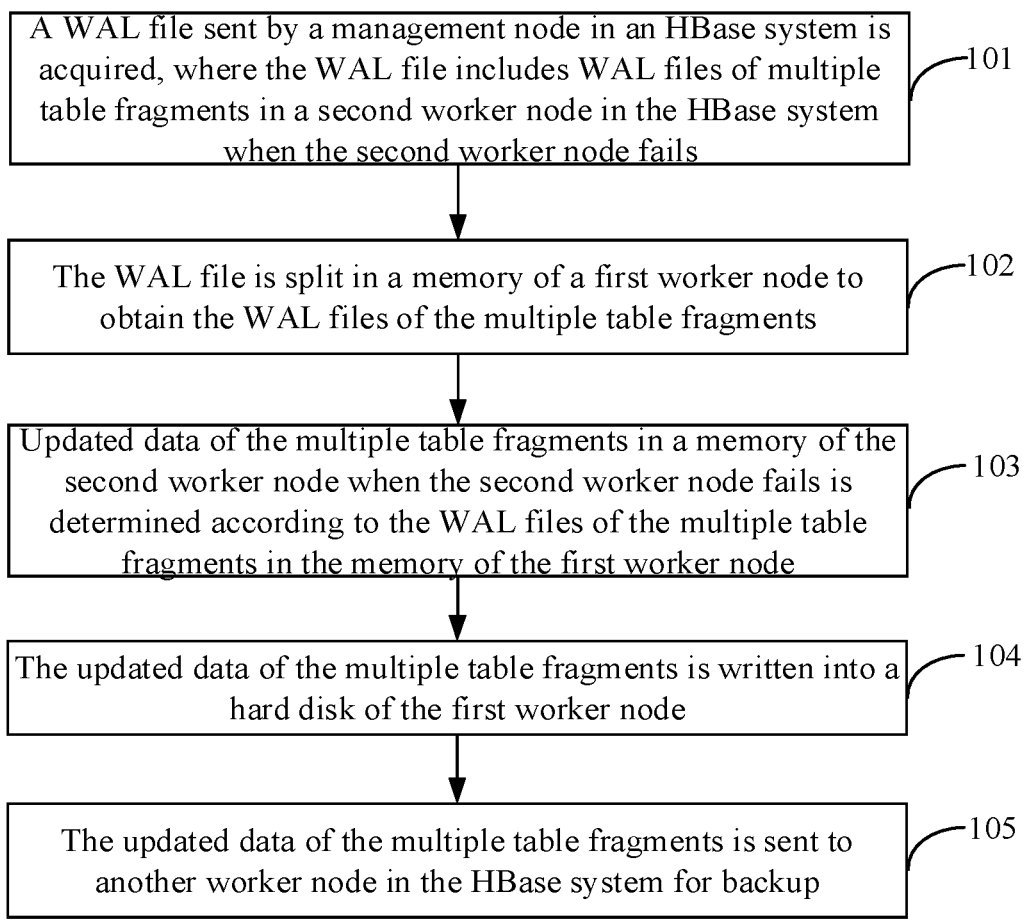
FIG. 3 illustrates a flowchart of yet another method for failover in an HBase system according to some embodiments of the present disclosure.

During implementation, referring to FIG. 3, which illustrates a flowchart of another method for failover in an HBase system according to some embodiments of the present disclosure, the first worker node, after executing the operation illustrated in block 104, may execute an operation illustrated in block 105, namely the updated data of the multiple table fragments is sent to another worker node in the HBase system for backup. Or, referring to FIG. 4, FIG. 4 illustrates a flowchart of another method for failover in an HBase system according to some embodiments of the present disclosure, the first worker node, after executing the operation illustrated in block 103, may execute an operation illustrated in block 105, namely the updated data of the multiple table fragments is sent to the another worker node in the HBase system for backup.

Based on the operation illustrated in block 105, the first worker node is endowed with a function of backing up the data in the HFile storage format to the another worker node, and then, when the first worker node fails, the data in the first worker node may be acquired from the another worker node, so that service availability of the HBase system is ensured.

Under the circumstance that a distributed file system is adopted for data management, the distributed file system includes multiple file system nodes, and the first worker node may send the data in the HFile storage format to the other worker node through a file system node cooperative with the first worker node.

Figure 4:
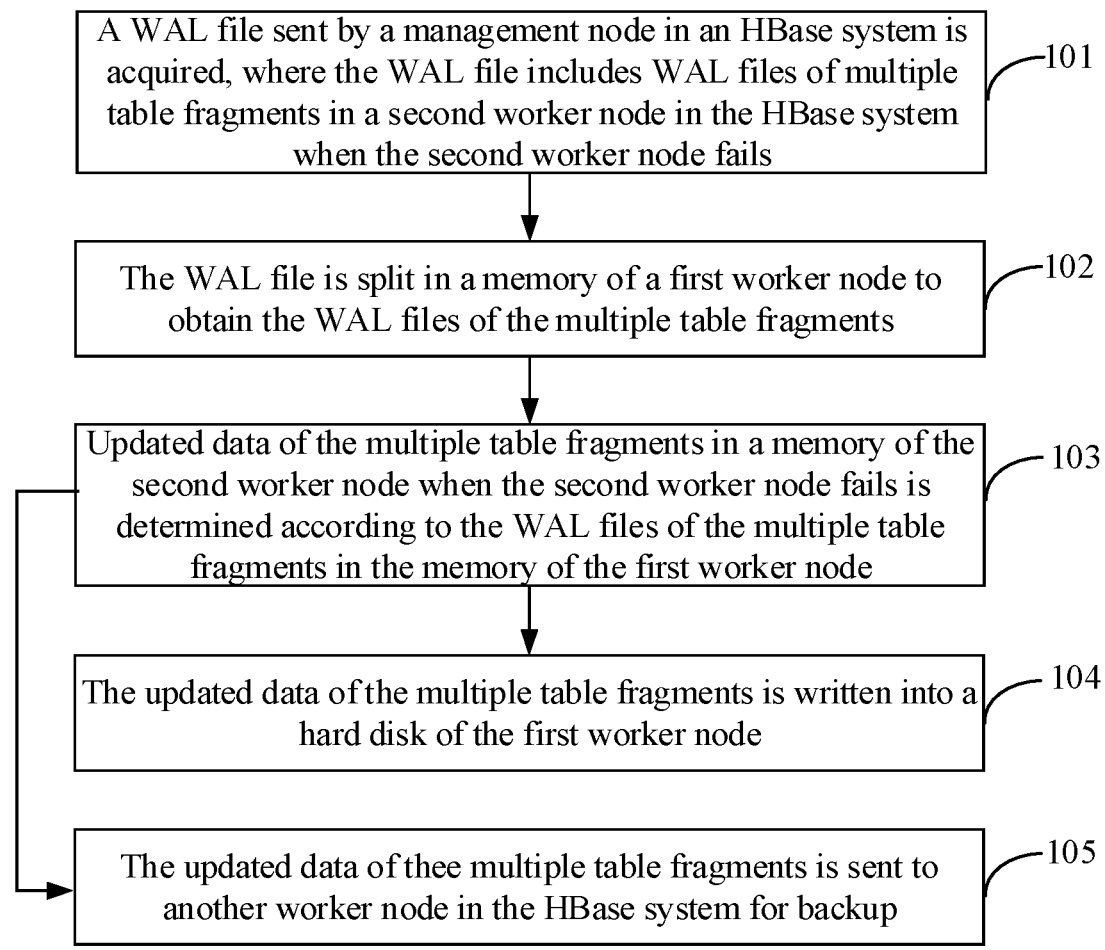
FIG. 4 illustrates a flowchart of still another method for failover in an HBase system according to some embodiments of the present disclosure.

In some embodiments, based on FIG. 3 or FIG. 4, the method may further include that: after the updated data of the multiple table fragments is written into the hard disk of the worker node itself and backed up to the another worker node, the table fragment is allowed to be read and write.

The first worker node, after writing the data in the HFile storage format into its own hard disk and determining that backup in the another worker node is completed, allows the table fragment to be read and write, thereby implementing failover of the table fragment and ensuring an available state of the table fragment.

Under the circumstance that the distributed file system is adopted for data management, the first worker node may receive a notification sent by the another worker node through the file system node cooperative with the another worker node and determine according to the notification that backup in the other worker node is completed.

In some embodiments, based on FIG. 3 or FIG. 4, the method may further include that: after the updated data of the multiple table fragments is written into the hard disk of the worker node itself and backed up to the another worker node, a notification about end of data transfer of the table fragment is sent to the management node.

The management node is configured to manage the table fragment information such as a storage position of the table fragment, and after the first worker node writes the data in the HFile storage format into its own hard disk and determines that backup in the other worker node is completed, the first worker node sends the notification about end of data transfer of the table fragment to the management node to enable the management node to modify the table fragment information such as the storage position of the table fragment in the management node according to the notification.

For simple description, each of the abovementioned method embodiments is expressed as a combination of a series of operations, but those skilled in the art should know that the present disclosure is not limited to the described operation sequence because some operations may be executed in other sequences or at the same time according to the present disclosure.

Further, those skilled in the art should also know that all the embodiments described in the specification are embodiments and involved operations and portions are not always required by the present disclosure.

Corresponding to the abovementioned application function realization method embodiments, the present disclosure also provides embodiments of an application function realization device and a corresponding terminal.

Figure 5:
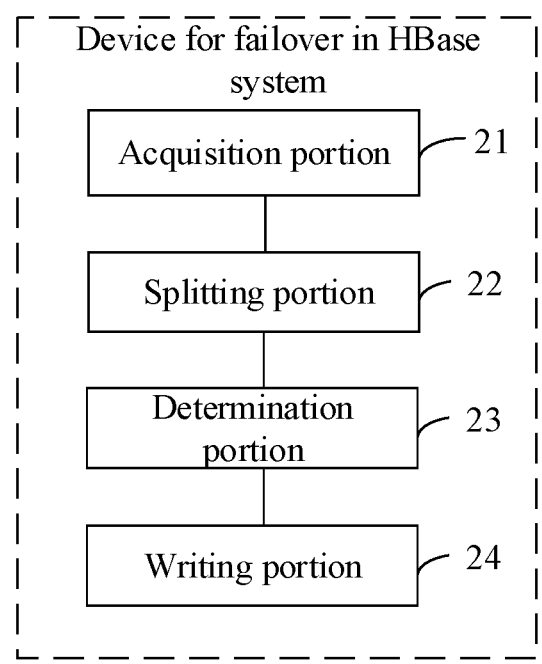
FIG. 5 illustrates a block diagram of a device for failover in an HBase system according to some embodiments of the present disclosure.

FIG. 5 illustrates a block diagram of a device for failover in an HBase system according to some embodiments of the present disclosure. The device is applied to a first worker node in the HBase system, and includes an acquisition portion 21, a splitting portion 22, a determination portion and a writing portion 24.

The various device components, circuits, modules, units, blocks, or portions may have modular configurations, or are composed of discrete components, but nonetheless may be referred to as "modules" or "portions" in general. In other words, the "components," "circuits," "modules," "units," "blocks," or "portions" referred to herein may or may not be in modular forms.

The acquisition portion 21 is configured to acquire a WAL file from a management node in the HBase system, where the WAL file includes WAL files of multiple table fragments in a second worker node in the HBase system when the second worker node fails.

The splitting portion 22 is configured to split the WAL file in a memory of the first worker node to obtain the WAL files of the multiple table fragments.

The determination portion 23 is configured to determine, based on the WAL files of the multiple table fragments in the memory of the first worker node, updated data of the multiple table fragments in a memory of the second worker node when the second worker fails.

The writing portion 24 is configured to write the updated data of the multiple table fragments into a hard disk of the first worker node.

Figure 6:
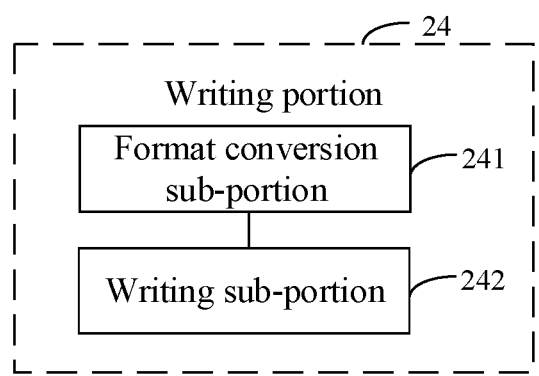
FIG. 6 illustrates a block diagram of another device for failover in an HBase system according to some embodiments of the present disclosure.

In some embodiments, based on the device for failover in the HBase system illustrated in FIG. 5, referring to FIG. 6, the writing portion 24 may include a format conversion sub-portion 242 and a writing sub-portion 242.

The format conversion sub-portion 241 is configured to, for the updated data of each table fragment, perform format conversion on the updated data of the table fragment to obtain data in an HFile storage format.

The write sub-portion 242 is configured to write the data in the HFile storage format into an HFile file of the table fragment in the hard disk of the first worker node.

In some embodiments, based on the failover device for the HBase system illustrated in FIG. 5, the device may further include a sending portion. The sending portion is configured to send the updated data of the multiple table fragments to another worker node in the HBase system for backup.

Figure 7:
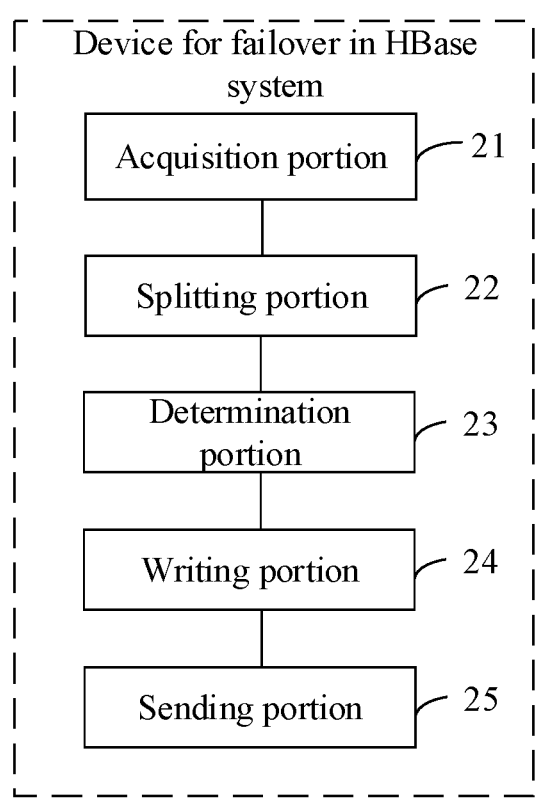
FIG. 7 illustrates a block diagram of yet another device for failover in an HBase system according to some embodiments of the present disclosure.

Referring to FIG. 7, the sending portion 25 may be configured to, after the write portion 24 writes the updated data of the multiple table fragments into the hard disk of the first worker node, send the updated data of the multiple table fragments to the other worker node in the HBase system for backup.

Figure 8:
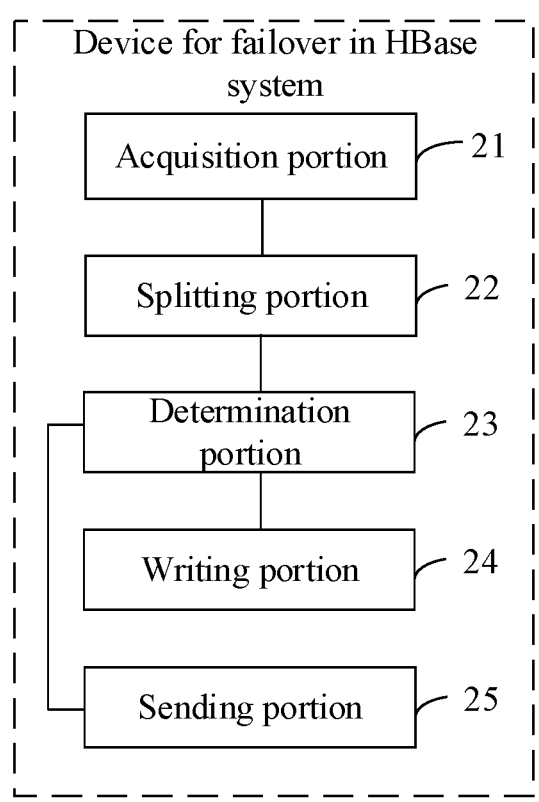
FIG. 8 illustrates a block diagram of still another device for failover in an HBase system according to some embodiments of the present disclosure.

Or, referring to FIG. 8, the sending portion 25 may be configured to, after the determination portion 23 determines the updated data of the multiple table fragments in the memory of the second worker node when the second worker node fails, send the updated data of the multiple table fragments to the another worker node in the HBase system for backup.

Based on the failover device for the HBase system illustrated in FIG. 5, the device may further include the sending portion.

The sending portion is configured to send the updated data of the multiple table fragments to the another worker node in the HBase system for backup.

In some embodiments, the device may further include a service portion.

The service portion is configured to, after the updated data of the multiple table fragments is written into the hard disk of the first worker node and backed up to the another worker node, allow the table fragment to be read and write.

In some embodiments, the device may further include a notification portion.

The notification portion is configured to, after the updated data of the multiple table fragments is written into the hard disk of the first worker node and backed up to the other worker node, send a notification about end of data transfer of the table fragment the management node.

The device embodiment substantially corresponds to the method embodiment, and thus related parts refer to part of descriptions of the method embodiment. The device embodiments described above are only schematic, units described as separate parts therein may or may not be physically separated, and parts displayed as units may or may not be physical units, and namely may be located in the same place or may also be distributed to multiple network units. Part or all of the portions therein may be selected according to a practical requirement to achieve the purpose of the solutions of the present disclosure. Those of ordinary skill in the art may understand and implement without creative work.

Figure 9:
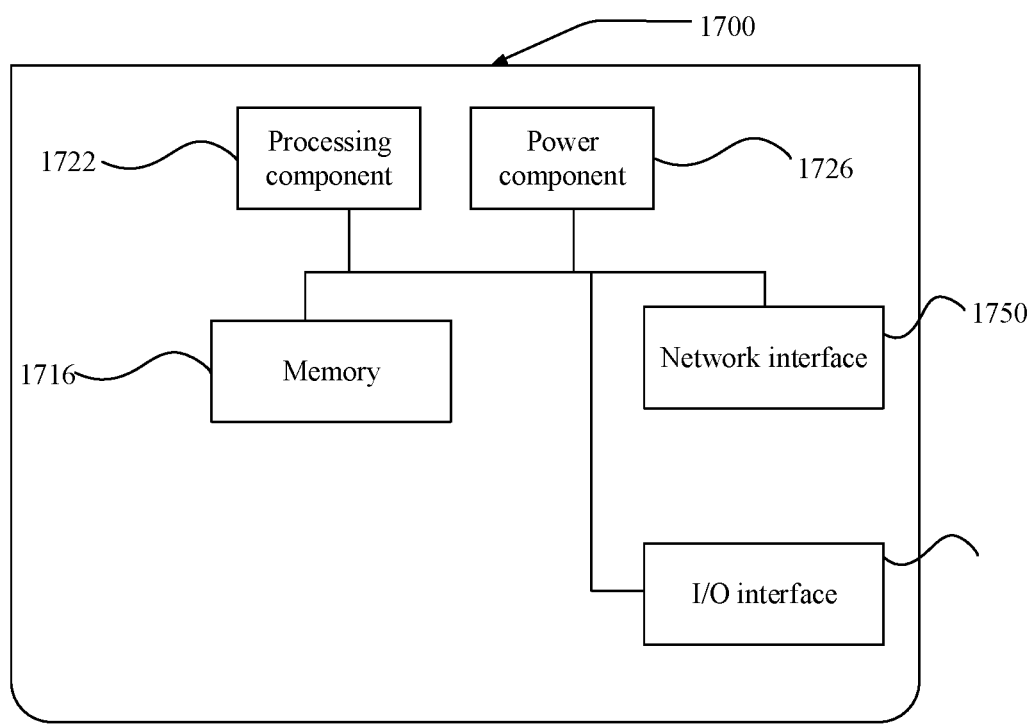
FIG. 9 illustrates a structure diagram of yet still another device for failover in an HBase system according to some embodiments of the present disclosure.

FIG. 9 illustrates a structure diagram of another device for failover 1700 in an HBase system according to some embodiments of the present disclosure. For example, the device 1700 may be provided as an application server.

Referring to FIG. 9, the device 1700 includes a processing component 1722, the processing component 1722 including one or more processors, and a memory resource represented by a memory 1716, configured to store instructions executable for the processing component 1722, for example, an application program. The application program stored in the memory 1716 may include one or more than one portion of which each corresponds to a set of instructions. In addition, the processing component 1722 is configured to execute the instructions to execute the failover method for the HBase system.

The device 1700 may further include a power component 1726 configured to execute power management of the device 1700, a wired or wireless network interface 1750 configured to connect the device 1700 to a network, and an input/output (I/O) interface 1758. The device 1700 may be operated based on an operating system stored in the memory 1716, such as, Android, iOS, Windows Server™, Mac OS X™, Unix™, Linux™, FreeBSD™ or the like.

In some embodiments, there is also provided a non-transitory computer-readable storage medium having stored therein instructions that (such as the memory 1716 including instructions), when executed by the processing component 1722 of the device 1700, cause the processing component 1722 to implement the abovementioned method. For example, the non-transitory computer-readable storage medium may be a read-only memory (ROM), a random-access memory (RAM), a compact disc read-only memory (CD-ROM), a magnetic tape, a floppy disc, an optical data storage device and the like.

The instructions in the memory 1716 are executed by the processing component 1722 to enable the device 1700 to execute a failover method for an HBase system. The failover method includes:

a WAL file sent by a management node in the HBase system is acquired, where the WAL file includes WAL files of multiple table fragments in a second worker node in the HBase system when the second worker node fails;

the WAL file is split in a memory of the first worker node to obtain the WAL files of the multiple table fragments;

updated data of the multiple table fragments in a memory of the second worker node when the second worker node fails is determined according to the WAL files of the multiple table fragments in the memory of the first worker node; and the updated data of the table fragments is written into a hard disk of the first worker node.

The terms "first" and "second" are used for descriptive purposes only and are not to be construed as indicating or implying a relative importance or implicitly indicating the number of technical features indicated. Thus, elements referred to as "first" and "second" can include one or more of the features either explicitly or implicitly. In the description of the present disclosure, "a plurality" indicates two or more unless specifically defined otherwise.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It is to be understood that "multiple" mentioned in the present disclosure refers to two or more than two. "And/or" describes an association relationship of associated objects and represent that three relationships can exist. For example, A and/or B can represent three conditions, i.e., independent existence of A, coexistence of A and B and independent existence of B. Character "/" usually represents that previous and next associated objects form an "or" relationship.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A method for failover in an HBase system, applied to a first worker node in the HBase system, the method comprising:
    acquiring a write-ahead logging (WAL) file from a management node in the HBase system, wherein the WAL file comprises WAL files of a plurality of table fragments in a second worker node in the HBase system when the second worker node fails;
    splitting the WAL file in a memory of the first worker node to obtain the WAL files of the plurality of table fragments;
    determining, based on the WAL files of the plurality of table fragments in the memory of the first worker node, updated data of the plurality of table fragments in a memory of the second worker node when the second worker node fails; and
    writing the updated data of the plurality of table fragments into a hard disk of the first worker node.

2. The method of claim 1, wherein writing the updated data of the plurality of table fragments into the hard disk of the first worker node comprises:

for updated data of each table fragment, performing format conversion on the updated data of the table fragment to obtain data in an HFile storage format; and writing the data in the HFile storage format into an HFile file of the table fragment in the hard disk of the first worker node.

3. The method of claim 1, further comprising:

sending the updated data of the plurality of table fragments to another worker node in the HBase system for backup.

4. The method of claim 3, further comprising:

after writing the updated data of the plurality of table fragments into the hard disk of the first worker node and backuping the updated data of the plurality of table fragments to the another worker node, allowing the table fragment to be read and write.

5. The method of claim 3, further comprising:

after writing the updated data of the plurality of table fragments into the hard disk of the first worker node and backuping the updated data of the plurality of table fragments to the another worker node, sending a notification about end of data transfer of the plurality of table fragments to the management node.

6. The method of claim 1, further comprising:

establishing a cooperative relationship between the first worker node and the second worker node, and when the second worker node fails, searching the cooperative relationship to determine the first worker node corresponding to the second worker node.

7. The method of claim 1, wherein splitting the WAL file in the memory of the first worker node to obtain the WAL files of the plurality of table fragments comprises:

recognizing identifiers of the WAL files of the plurality of table fragments to obtain the WAL files of the plurality of table fragments.

8. A non-transitory computer-readable storage medium having stored therein a computer program that, when executed by a processor, causes the processor to implement a method for failover in an HBase system, wherein the method is executed by a first worker node in the HBase system, and the method comprises:

acquiring a write-ahead logging (WAL) file from a management node in the HBase system, wherein the WAL file comprises WAL files of a plurality of table fragments in a second worker node in the HBase system when the second worker node fails;

splitting the WAL file in a memory of the first worker node to obtain the WAL files of the plurality of table fragments;

determining, based on the WAL files of the plurality of table fragments in the memory of the first worker node, updated data of the plurality of table fragments in a memory of the second worker node when the second worker node fails; and writing the updated data of the plurality of table fragments into a hard disk of the first worker node.

9. The non-transitory computer-readable storage medium of claim 8, wherein writing the updated data of the plurality of table fragments into the hard disk of the first worker node comprises:

for updated data of each table fragment, performing format conversion on the updated data of the table fragment to obtain data in an HFile storage format; and writing the data in the HFile storage format into an HFile file of the table fragment in the hard disk of the first worker node.

10. The non-transitory computer-readable storage medium of claim 8, wherein the method further comprises:

sending the updated data of the plurality of table fragments to another worker node in the HBase system for backup.

11. The non-transitory computer-readable storage medium of claim 10, wherein the method further comprises:

after writing the updated data of the plurality of table fragments into the hard disk of the first worker node and backuping the updated data of the plurality of table fragments to the another worker node, allowing the table fragment to be read and write.

12. The non-transitory computer-readable storage medium of claim 10, wherein the method further comprises:

after writing the updated data of the plurality of table fragments into the hard disk of the first worker node and backuping the updated data of the plurality of table fragments to the another worker node, sending a notification about end of data transfer of the plurality of table fragments to the management node.

13. The non-transitory computer-readable storage medium of claim 8, wherein the method further comprises:

establishing a cooperative relationship between the first worker node and the second worker node, and when the second worker node fails, searching the cooperative relationship to determine the first worker node corresponding to the second worker node.

14. The non-transitory computer-readable storage medium of claim 8, wherein splitting the WAL file in the memory of the first worker node to obtain the WAL files of the plurality of table fragments comprises:

recognizing identifiers of the WAL files of the plurality of table fragments to obtain the WAL files of the plurality of table fragments.

15. A device for failover in an HBase system, comprising:

a processor; and a memory configured to store instructions executable for the processor, wherein the processor is configured to:

acquire a write-ahead logging (WAL) file from a management node in the HBase system, wherein the WAL file comprises WAL files of a plurality of table fragments in a second worker node in the HBase system when the second worker node fails;

split the WAL file in a memory of a first worker node to obtain the WAL files of the plurality of table fragments;

determine, based on the WAL files of the plurality of table fragments in the memory of the first worker node, updated data of the plurality of table fragments in a memory of the second worker node when the second worker node fails; and write the updated data of the plurality of table fragments into a hard disk of the first worker node.

16. The device of claim 15, wherein the processor is further configured to:

for updated data of each table fragment, perform format conversion on the updated data of the table fragment to obtain data in an HFile storage format; and write the data in the HFile storage format into an HFile file of the table fragment in the hard disk of the first worker node.

17. The device of claim 15, wherein the processor is further configured to:

send the updated data of the plurality of table fragments to another worker node in the HBase system for backup.

18. The device of claim 15, wherein the processor is further configured to:
 after the updated data of the plurality of table fragments is written into the hard disk of the first worker node and backed up to the another worker node, allow the table fragment to be read and write.

19. The device of claim 15, wherein the processor is further configured to:
 after the updated data of the plurality of table fragments is written into the hard disk of the first worker node and backed up to the another worker node, send a notification about end of data transfer of the plurality of table fragments to the management node.

20. The device of claim 15, wherein the processor is further configured to:
 establish a cooperative relationship between the first worker node and the second worker node, and
 when the second worker node fails, search the cooperative relationship to determine the first worker node corresponding to the second worker node.

* * * * *